Figure 1:
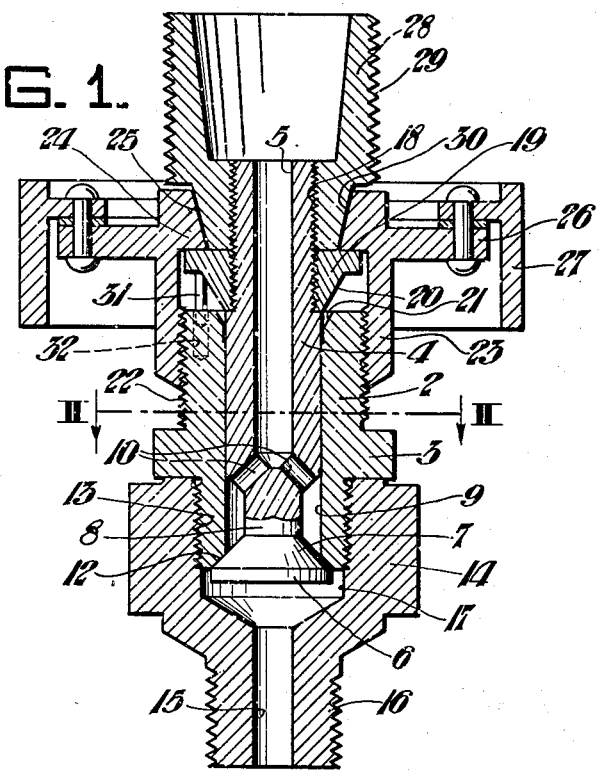

July 27, 1943.  W. J. KIENE  2,325,325

VALVE

Filed Aug. 13, 1941

Inventor:
WILLIAM J. KIENE,
by John E. Jackson
his Attorney.

Patented July 27, 1943

2,325,325

UNITED STATES PATENT OFFICE 2,325,325

VALVE

William J. Kiene, Chicago, Ill.

Application August 13, 1941, Serial No. 406,702

6 Claims. (Cl. 251—8)

This invention relates to valves and especially to an improved valve which is particularly adaptable for use in connecting a gage to a source of gas supply or fluid pipe lines for determining the pressure thereof.

It is one of the objects of the present invention to provide an improved valve or cock for connecting a gage or pressure indicator to the cylinder of internal combustion engines and the like for the purpose of determining the pressure therein.

It is another object of the invention to provide an improved valve or cock which is simple and compact in its construction and, at the same time, one which is efficient and effective in its use.

It is a further object of this invention to provide an improved valve or cock which can be conveniently made from parts which can be easily and quickly machined and fabricated, thereby reducing the cost of the valve to a minimum.

Various other objects and advantages of this invention will become more apparent during the course of the following specification and will be particularly pointed out in the appended claims.

In the accompanying drawing, there is shown, for the purpose of illustration, one embodiment which my invention may assume in practice.

Figure 2:
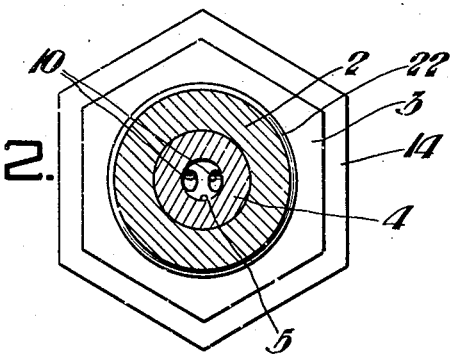

In the drawing:

Figure 1 is a longitudinal sectional view of the improved valve of my invention; and Figure 2 is a sectional view taken on the line II—II of Figure 1.

Referring more particularly to the drawing, the improved valve or cock of my invention comprises a tubular body member or bonnet 2 preferably having a circumferential flange 3 arranged therearound. There is arranged through the tubular body member 2 a hollow spindle or valve stem 4 having an axially positioned passageway 5 arranged through a portion thereof at one end of the same. On the lower or one end of the valve stem 4 there is arranged integral therewith a valve portion 6 having an inner tapered or beveled portion 7. The valve stem has a small diameter portion 8 which is positioned immediately above or beyond the valve portion 6 with the diameter of this portion being smaller than both the diameter of the remainder of the valve stem and the inner diameter of the tubular body member 2 so as to provide an annular passageway 9 therearound between the small diameter portion 8 and the inner wall of the tubular body member.

There is arranged through the wall of the valve stem 4 at a point above or beyond the valve portion 6 and the small diameter portion 8, a plurality of port holes 10 which connect the annular passageway 9 with the hollow interior or passageway 5 of the valve stem. The valve stem 4, together with the valve portion 6 carried thereby, is preferably made from one piece of material and can be conveniently made from a piece of metallic bar stock.

On the lower or one end of the tubular body member or bonnet 2 there is provided a tapered valve seat 12 with which the tapered or beveled portion 7 of the valve 6 cooperates to close the valve. On the same end of the body member 2 and immediately below the flange 3 carried thereby there is arranged a threaded portion 13 which preferably has a right-hand thread. There is threaded onto this threaded portion 13 a connecting member 14 having a passageway 15 arranged therethrough and preferably an outer threaded portion 16 on the end thereof for connecting the valve assembly to the source of fluid or gas supply such as the cylinder of an internal combustion engine. There is positioned within the connecting member 14 a chamber 17 for housing valve portion 6 of the valve stem 4 together with the valve seat 12 with which it cooperates. The chamber 17 communicates with the passageway 15 through the connecting member 14 for permitting limited movement of the valve 6 therein.

There is arranged on the end of the valve stem 4, opposite that from the valve portion 6, an outer threaded portion 18 which preferably has a right-hand thread. There is threaded on this threaded portion 18 an annular sealing member 19 having an inner beveled surface 20 which is adapted to cooperate with a tapered seat portion 21 arranged in that end of the tubular body member 2 next to the valve stem for sealing the same and preventing leakage therearound when the valve is fully opened in a manner hereinafter to be described.

On the end of the tubular body member opposite that from the valve seat 12 there is arranged an outer threaded portion 22 which has preferably a left-hand thread. There is arranged on this threaded portion a nut-like member 23 for actuating the valve stem 4 in a manner hereinafter to be described. With the nut-like member 23 there is arranged an inwardly extending flange portion 24, the lower or inner side of which rests upon the annular sealing member 19 and which has preferably an inwardly tapered portion 25. There is also carried by the nut-like member 23, preferably a circumferential flange portion 26 to which there is securely attached preferably an annular hand wheel member 27 for rotating the nut-like member.

There is also mounted on the threaded portion 18 of the valve stem 4 above or on the outer side of the annular sealing member 19, a connecting member 28 for delivering the fluid or gas from the valve and having an outer threaded portion 29 which preferably has a right-hand thread to which the gage or other indicating means is adapted to be connected. On the inner or lower end of the connecting member there is arranged preferably a tapered portion 30 corresponding to the tapered portion 25 carried by the flange of the nut-like member 23 with which it is adapted to cooperate.

There is also provided preferably a pin 31 carried by the annular sealing member 19 which is adapted to fit into a hole 32 arranged in the top or inner side of the tubular body member 2 and which is adapted to keep the valve stem 4 in position so as to prevent the same from turning when the nut-like member 23 is rotated to open and close the valve, thus limiting the movement of the valve stem to a reciprocable movement within the tubular body member.

The valve of the present invention functions in the following manner. When the valve is closed, the valve portion 6 carried by the stem 4 is fully seated upon the valve seat 12 as shown in Figure 1 of the drawings. When it is desired to open the valve, the nut-like member 23 is turned by means of the hand wheel 27 carried thereby so as to move the valve portion 6 downwardly or outwardly away from its seat 12. It will be understood that when the nut-like member 23 is turned, it moves the valve stem 4, together with the annular sealing member 19 and the connecting member 28 carried thereby. When the valve has reached its fully open position, the tapered or beveled portion 20 of the annular sealing member 19 will be seated against the beveled portion 21 of the inner or upper end of the tubular body member 2, thus sealing the space between the valve stem 4 and the tubular body member 2, so as to prevent the escape of the fluid or gas therebetween. The fluid or gases will then pass into the valve through the passageway 15 of the connecting member 14 into the chamber 17 therein, around the valve portion 6, into the annular passageway 9 through the port holes 10 into the axially arranged passageway 5 within the valve stem 4, and out through the connecting member 28 to the gage or indicating means. When the valve is in its closed position, as shown, it will be seen that the inwardly tapered portion 25 of the nut-like member 23 abuts against the tapered portion 30 of the connecting member 28 and it will be seen that any further movement of the valve in the closed direction will tend to provide a wedging action around the lower or inner end of the connecting member 28, thereby tending to lock the same and to prevent the connecting member from turning.

It will be seen that all the threaded portions of the valve are right-handed except those of the nut-like member 23 and the outer threaded portion 22 of the tubular body member 2, which are left-handed. This left-handed threaded arrangement makes possible a conventionally operated valve, i. e., the nut-like member 23 is turned to the right to close the valve and to the left to open the same.

As a result of my invention, it will be seen that there is provided a valve which can be inexpensively and conveniently made from parts formed and machined from bar stock or tubing or pipe and that no special forgings are necessary. The parts subject to the corrosive action of hot gases, such as the bonnet or tubular body member 2 and the valve and valve stem 4 can be made if desired from highly resistant steel. At the same time, it will also be seen that the valve or cock is rugged and compact in its construction approaching the plug type valve or cock. It will be seen that pressure tends to close the valve and it will be understood that the valve can be rubbed into its seat while the same is in use, which are decided advantages.

While I have shown and described one specific embodiment of my invention, it will be understood that this embodiment is merely for the purpose of illustration and description and that various other forms may be devised within the scope of my invention, as defined in the appended claims.

I claim:

1. A valve of the class described comprising a tubular body member, a hollow valve stem arranged through said body member for reciprocable movement therein, a valve arranged on one end of said valve stem and an exteriorly threaded portion arranged on the opposite end thereof, said tubular body member having a valve seat arranged at one end thereof with which said valve is adapted to cooperate to close said valve, said valve stem having a plurality of port holes arranged through the wall thereof at a point beyond said valve and communicating with the hollow interior of said valve stem, an annular beveled member arranged on the threaded portion of said valve stem beyond said tubular body member, said tubular body member having a tapered seat arranged adjacent said valve stem on the end opposite that from said valve seat with which the beveled portion of said annular member is adapted to cooperate for sealing and preventing leakage around the valve stem when the valve is open, a nut-like member carried by said valve stem which is arranged therearound and freely rotatable relative thereto, said tubular body member having an outer left-handed threaded portion arranged on the end thereof opposite that from said valve seat with which the inner threaded portion of said nut-like member is adapted to cooperate to move said valve stem reciprocably in said tubular member so as to open and close said valve, means for rotating said nut-like member, said tubular body member having an outer right-hand threaded portion arranged thereon on the same end as said valve seat, a connecting member arranged on said last-mentioned threaded portion for introducing a fluid through the port holes of said stem and into the hollow interior thereof, and a connecting member arranged on the threaded portion of said valve stem beyond said annular beveled member for delivering the fluid therefrom.

2. A valve of the class described comprising a tubular body member, a hollow valve stem arranged through said body member for reciprocable movement therein, a valve arranged on one end of said valve stem and an exteriorly threaded portion arranged on the opposite end thereof, said tubular body member having a valve seat arranged at one end thereof with which said valve is adapted to cooperate to close said valve, said valve stem having at least one port hole arranged through the wall thereof at a point adjacent said valve and communicating with the hollow interior of said valve stem, a nut-like member carried by said body member on the end thereof opposite that from said valve, said tubular body member having an outer threaded portion arranged thereon on the end opposite that from the valve seat with which the inner threaded portion of said nut-like member is adapted to cooperate to move said valve stem reciprocably in said tubular body member so as to open and close said valve, and an interiorly threaded connecting member arranged on the threaded end portion of said valve stem having an exteriorly tapered portion arranged on the inner end thereof, said nut-like member having a similar interiorly tapered portion carried thereby which is adapted to cooperate with the tapered portion of said connecting member when the valve stem is moved to its closed position so as to provide a wedging action around the tapered portion of said connecting member thereby tending to lock the same in its closed position.

3. A valve of the class described comprising a tubular body member, a hollow valve stem arranged through said body member for reciprocable movement therein, a valve portion arranged on one end of said valve stem, and an exteriorly right-hand threaded portion arranged on the opposite end thereof, said tubular body member having a valve seat arranged at one end thereof with which said valve is adapted to cooperate to close said valve, said valve stem having at least one port hole arranged through the wall thereof at a point beyond said valve portion and communicating with the hollow interior of said valve stem, an annular beveled member arranged on the threaded portion of said valve stem beyond said tubular body member, said tubular body member having a tapered seat arranged on the end opposite that from said valve seat with which the beveled portion of said annular member is adapted to cooperate for sealing and preventing leakage around the valve stem when the valve is open, a nut-like member carried by said body member beyond said annular member, said tubular body member having an outer left-hand threaded portion arranged on the end thereof opposite that from said valve seat with which the inner threaded portion of said nut-like member is adapted to cooperate to move said valve stem reciprocably in said body member so as to open and close said valve, an interiorly threaded connecting member arranged on the threaded portion of said valve stem beyond said annular beveled member and on the end thereof opposite that from said valve, said connecting member having an exteriorly tapered portion arranged on the inner end thereof, said nut-like member having a similar interiorly tapered portion which is adapted to cooperate with the tapered portion of said connecting member when the valve is in its closed position so as to provide a wedging action around the tapered portion of said connecting member thereby tending to lock the same on the threaded portion of the valve stem.

4. A valve of the class described comprising a hollow body member, a valve stem arranged in the hollow portion of said body member for reciprocable movement therein, a valve arranged on the inner end of said valve stem consisting of a flange portion, said body member having a seat arranged therein with which said valve is adapted to cooperate to close the valve when the valve stem is moved reciprocably through the hollow portion of the body member, a left-hand outer threaded portion arranged on said body member, a left-hand interiorly threaded member disposed on the threaded portion of said body member and which engages said valve stem and cooperates with the outer left-hand threaded portion of said body member to move said valve stem reciprocably in the body member to open and close the valve, and means arranged on said valve stem beyond said left-hand interiorly threaded member which is adapted to cooperate therewith to prevent further rotative movement of the same relative to said valve stem and said body member when the valve stem is moved so that the valve is disposed in its fully closed position whereby the valve stem is locked in such closed position.

5. A valve stem of the class described as defined in claim 4, including a member carried by said valve stem and disposed between the valve and the left-hand interiorly threaded member having a tapered surface thereon which is adapted to cooperate with a similar tapered surface carried by the body member to seal the space between the valve stem and the body member so as to prevent leakage therebetween when the valve stem is moved to position to fully open the valve.

6. A valve stem of the class described, as defined in claim 4, wherein the means arranged beyond the left-hand interiorly threaded member for locking the same consists of a tapered portion carried by the left-hand interiorly threaded member which cooperates with a tapered portion carried by a member arranged on the outer end of the valve stem.

WILLIAM J. KIENE.